Figure 1:
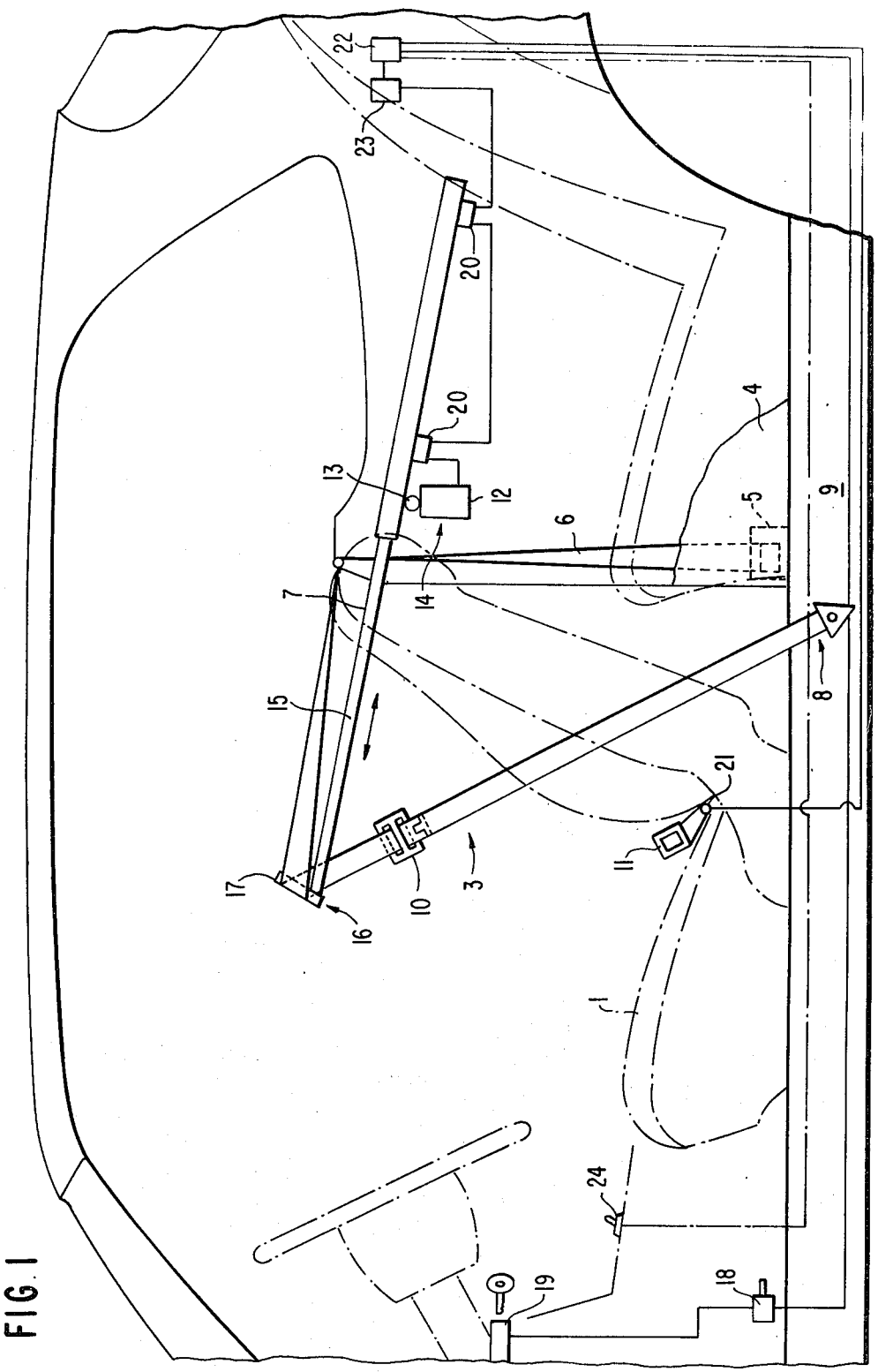

United States Patent [19]

Andres et al.

[11] 4,432,566
[45] Feb. 21, 1984

[54] SEAT BELT SYSTEM

[75] Inventors: Rudolf Andres, Sindelfingen; Eduard Ament, Aichwald, both of Fed. Rep. of Germany

[73] Assignee: Daimler-Benz Aktiengesellschaft, Fed. Rep. of Germany

[21] Appl. No.: 381,979

[22] Filed: May 26, 1982

[30] Foreign Application Priority Data

May 26, 1981 [DE] Fed. Rep. of Germany ....... 3120843

[51] Int. Cl.³ .............................................. B60R 21/02
[52] U.S. Cl. ..................................... 280/807; 297/481
[58] Field of Search ............... 280/801, 802, 807, 808; 297/468, 474, 481, 483

[56] References Cited

U.S. PATENT DOCUMENTS 4,175,633 11/1979 Andres et al. ...................... 280/807

FOREIGN PATENT DOCUMENTS 2312890 10/1973 Fed. Rep. of Germany ...... 280/807
2108483 6/1979 Fed. Rep. of Germany ...... 280/801

Primary Examiner—Joseph F. Peters, Jr.
Assistant Examiner—Ross Weaver
Attorney, Agent, or Firm—Craig & Burns

[57] ABSTRACT

A two-door passenger motor vehicle is provided with a mechanism for feeding a locking clasp and/or belt strap of a seat belt system, with the mechanism including an overload safety device for stopping a motor of the feeding mechanism so as to protect it and a power source, such as a vehicle battery, from damages when an obstacle is projected into the course of movement of the feeder arm, or the feeder arm is in an end position and is no longer reversed or switched off. The overload safety device also responds in the case of a delay-dependent blocking of the belt strap, but initiates a new feeding movement. When the front end position is reached, an automatic return of the feeder arm by a predetermined amount takes place so as to release a blocking effect of a belt roller of the seat belt system and the feeder arm is then subsequently returned to a retracted position.

6 Claims, 2 Drawing Figures

SEAT BELT SYSTEM

BACKGROUND AND SUMMARY OF THE INVENTION

The present invention relates to a seat belt system and, more particularly, to a mechanism for feeding of a locking clasp and/or a belt strap of a seat belt system having a belt holder into a position wherein the locking clasp and/or belt strap may be easily gripped so as to enable a fastening of the seat belt.

A seat belt mechanism for, preferably, a two-door passenger motor vehicle, has been proposed wherein, after a closing of the vehicle door and a turning on of the power, a servo mechanism associated with the vehicle door, is adapted to bring a feeder arm, together with the locking clasp and/or belt strap, from a rear position, not impairing free access to the back seats, by a straight feeding movement to a front position assigned to the driver or front seat passenger of the motor vehicle. The feeder arm, immediately after a completed buckling operation, or when the buckling operation does not take place during a predetermined time interval, returns to the starting position where an overload safety device is provided which, for example, in situations wherein there is an unusual rise in force, switches off the servo arrangement.

In, for example, Offenlegungsschrift No. 27 13 172, a mechanism of the aforementioned type is proposed wherein, in response to the overload safety device, the feeder arm stays in the respective position, thereby severely impairing the free access or passage to the rear seats of the motor vehicle. Operational experiences with such mechanisms have shown that the overload safety device, in the course of a feeding movement, especially on the passenger front seat side, is triggered much more frequently than assumed because very often, after the front seat passenger gets into the vehicle, the vehicle is accelerated or slowed down again before the front seat passenger has buckled the seat belt, and an automatic locking of the belt roller takes place during such process.

The aim underlying the present invention essentially resides in providing a seat belt system which includes an overload safety means constructed in such a manner that only in situations of a permanent disturbance, is the safety device brought into a condition for preventing a renewed switching on of the servo arrangement and a temporarily occurring blocking of the belt roller of the safety belt system does not prevent the use of the seat belt.

In accordance with advantageous features of the present invention, a safety belt system is provided wherein, when an overload safety means responds during a feeding movement, the servo arrangement is reversed and, upon reaching a rear end position, a new feeding movement automatically takes place. After a front end position is reached by the feeding arm, the servo arrangement is also reversed and the feeder arm is returned by a small amount that releases the blocking effect of the belt roller that may have occurred. After an at least one-time response of the overload safety means during a feeding movement and with a first-time response during a return movement, a new start of the servo arrangement is possible only after the particular disturbance acting on the safety belt has been corrected or eliminated.

In accordance with further advantageous features of the present invention, when the servo arrangement is stopped in response to the overload safety means, the feeder arm may then manually be brought to a rear starting position, thereby enabling unimpaired access to the back seats of the vehicle even if a disturbance has occurred.

Accordingly, it is an object of the present invention to provide a mechanism for feeding of a locking clasp and/or belt strap of a seat belt system having a belt roller which avoids, by a simple means, shortcomings and disadvantages encountered in the prior art.

Another object of the present invention resides in providing a mechanism for a feeding of a locking clasp and/or belt strap of a seat belt system of a motor vehicle which does not impair access into and out of the motor vehicle.

Yet another object of the present invention resides in providing a mechanism for a feeding of a locking clasp and/or belt strap of a seat belt system which is responsive to an overload safety means so as to automatically effect a new feeding of the locking clasp and/or belt strap.

A further object of the present invention resides in providing a mechanism for a feeding of a locking clasp and/or belt strap of a seat belt system which is simple in construction and therefore relatively inexpensive to manufacture.

A still further object of the present invention resides in providing a mechanism for a feeding of a locking clasp and/or belt strap of a seat belt system which functions reliably under all load conditions.

Figure 2:
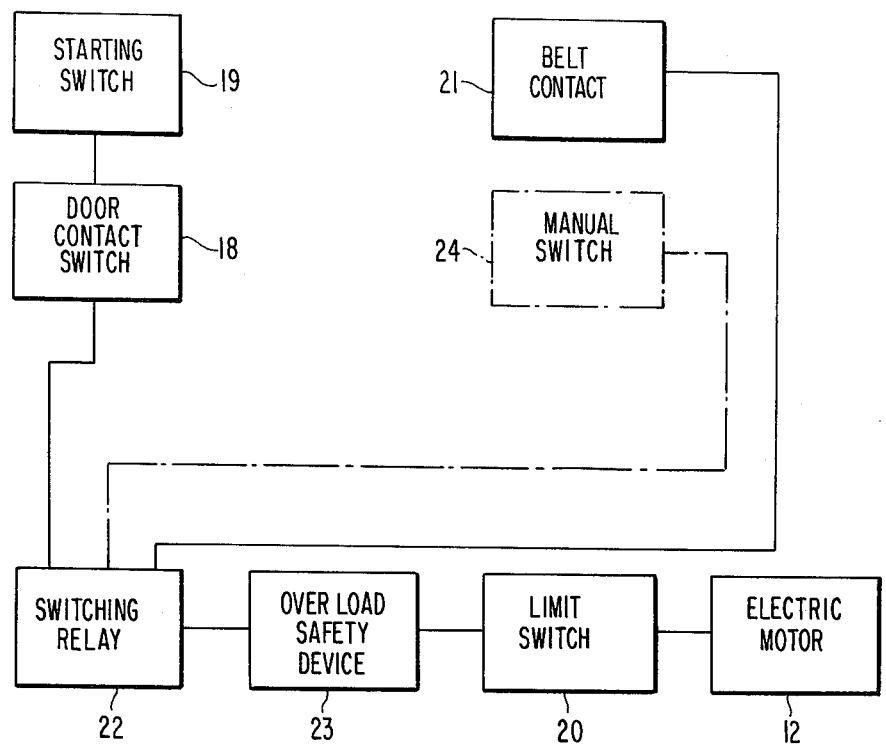

These and other objects, features, and advantages of the present invention will become more apparent from the following description when taken in connection with the accompanying drawings which show, for the purposes of illustration only, one embodiment in accordance with the present invention, and wherein:

FIG. 1 is a partially schematic lateral view of a mechanism for feeding of a locking clasp and/or belt strap of a seat belt system for a passenger motor vehicle constructed in accordance with the present invention; and FIG. 2 is a block diagram of the mechanism of FIG. 1.

Referring now to the drawings, wherein like reference numerals are used in both views to designate like parts and, more particularly, to FIG. 1, according to this figure, a two-door passenger motor vehicle is provided with front seats 1 and back seats 2, and is equipped with an automatic three-point safety belt system generally designated by the reference numeral 3 for providing a passenger protection for passengers sitting in the front seat 1 of the motor vehicle. The three-point safety belt system 3 includes a belt roller 5 which is covered, in a direction of an interior of the motor vehicle, by a lining or a covering 4. A belt strap 6 of the safety belt system 3 extends from the belt roller 5 and is guided over a deviating mounting means 7 disposed on an upper side of the lining or covering 4. A free end, generally designated by the reference numeral 8, of the belt strap 6 is fastened on an inside of a longitudinally-extending support member 9 of the vehicle, while a belt fastener 11, adapted to receive a locking clasp 10 of the safety belt system 3, being arranged so as to project from, for example, a center tunnel of the motor vehicle.

A servo arrangement, generally designated by the reference numeral 14, includes an electric motor 12 and a conduction device 13. The servo arrangement 14 is arranged so as to be covered by the interior lining or covering 4. The servo arrangement 14 also includes a feeder arm 15 having a free end generally designated by the reference numeral 16, with the free end 16 receiving or accommodating a pass-through mounting means 17, with the locking clasp 10 being attachable to the free or front end 16.

The method of operation of the mechanism of the present invention is as follows:

As shown in FIGS. 1 and 2, when the passenger motor vehicle is unoccupied, the feeder arm 15, in contrast to the position in FIG. 1, is in a retracted or withdrawn position. In the retracted or withdrawn position, the belt strap 6 is rolled up on the roller 5 and the locking clasp 10 rests against the mounting means 17, which itself is located only slightly forwardly of the mounting 7, as viewed in a normal driving direction of the vehicle. When a driver or front seat passenger enters the motor vehicle and closes a door (not shown) of the motor vehicle, the door switch contact 18 is closed. With the power for the motor vehicle being turned-on by, for example, a starting switch 19, a feeding movement of the feeder arm 15 begins.

At an end of the feeder movement of the feeder arm 15, which takes place in a diagonally upwardly straight line, and which is limited by a limit switch 20, the locking clasp 10 is then disposed in a position where it may easily be gripped by the driver or passenger motor vehicle and be easily led or guided to the belt lock 11. When the locking clasp 10 locks, a contact switch means 21 in the belt lock 11 is activated, whereupon a switching relay 22 is reversed. By virtue of the action of the switching relay 22, the direction of rotation of the electric motor 12 is thus reversed, and the motor 12 brings the feeder arm 15 back into the starting position, in which position motor 12 is then switched off by another limit switch 20.

When the belt lock 11 is opened, the locking clasp 10 is then brought in a direction of the mounting means 17 which rests against the lining or covering 4, with the slack in the belt straps 6 automatically being taken up until the belt strap 6 is tightened and free access to the back seats 9 is not impaired.

If the driver or front seat passenger forgets to insert the locking clasp into the belt lock 11 after the locking clasp 10 is offered by the feeder arm 15, or intentionally does not buckle the seat belt, the feeder arm 15, together with the locking clasp 10, accommodated at the free end 16 of the feeder arm 15, after a predetermined or selectable time interval, which time interval is generally longer than that required for normally buckling the seat belts, triggered by the time switch integrated into the switching relay 22, automatically returns the feeder arm 15 into the starting position. The automatic switching may be replaced or supplemented by a manual switch 24, which may be disposed at a point in the motor vehicle that is easy to reach by both the driver and the front seat passenger.

If, during a feeding movement of the feeder arm 15, an excessive increase in force should occur, an overload safety device 23 responds by causing a reversing in the direction of rotation of the electric motor 12 and, after a rear end position of the feeder arm 15 is reached, another feeding movement is then initiated. In most situations, the increase in force may be caused by the face that the feeding movement still continues while the vehicle is already accelerated or being slowed down so much that the belt roller 5 is blocked. By means of a reversal of the direction in the movement of the feeder arm 15, the short-term blockage is discontinued and a normal feeding of the belt strap 6 may then take place.

In rare situations, a response of the overload safety device 23 may also be caused by the application of a pushing force against the feeder arm 15. If this occurs, by simple conventional technical measures with respect to the circuit of the overload safety device, in the case of a two-time consecutive triggering of the overload safety device 23, the feeder arm 15 during the second return remains in the rear position. By corresponding means, it is the prevented that another feeding movement is initiated before the damage or source of a force on the feeder arm 15 is eliminated. This may, for example, be achieved by providing a construction wherein the safety element or overload safety device may only be exchanged by trained personnel.

Additionally, the switching arrangement is selected in such a manner that, when the front end position is reached, a reversal also takes place and the feeder arm 15 is retracted or goes back by a certain amount. This arrangement ensures that the belt strap 6 may also be put on if the blocking of the belt roller should occur at the end of the feeding movement of the feeder arm 15 without the overload safety device 23 being able to provide an appropriate response.

If the overload safety device 23 is, for example, triggered during a return movement of the feeder arm 15, no further motor-caused adjusting movement will take place and a testing of the overall mechanism by a trained personnel becomes necessary so that, after the elimination of the disturbance or problem, the trained personnel may, for example, exchange the safety element. However, in order to enable the back seat passengers to enter or leave the car conveniently, by a simple easy disconnection of the electric motor 12, the possibility is provided for a manual movement of the feeder arm 15.

While we have shown and described only one embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A mechanism for feeding at least one of a locking means and a belt strap of a safety belt system of a motor vehicle, the safety belt system including a blockable belt roller means, the mechanism includes a displaceably mounted feeder means for feeding at least one of the locking means and belt strap between a retracted position and a forward position for enabling at least one of the locking means and belt strap to be equipped by an occupant of the motor vehicle, means for displacing the feeder arm means between the retracted and forward positions, and means for controlling an operation of the means for displacing, characterized in that an overload safety means is provided for reversing a displacement direction of the means for displacing so as to return the feeder arm means to a retracted position in response to the feeder arm means encountering an unusual rise in force applied thereto during a feeding displacement of the feeder arm means and for automatically initiating a new feeding displacement of the feeder arm means upon the feeder arm means returning to the retracted position, means are provided for enabling a displacement of the feeder arm means from the forward position in a direction of the retracted position by an amount sufficient to release a blocking effect of the belt roller means, and in that means are provided for preventing a restarting of the means for displacing after at least a one-time response of the overload safety means during the feeding displacement of the feeder arm means and a onetime response during a return displacement of the feeder arm means until a source of the force applied to the feeder arm means is removed.

2. A mechanism according to claim 1, in a two-door passenger motor vehicle, characterized in that a feeder arm means is associated with each door of the motor vehicle, the means for controlling an operation of the means for displacing includes a switch means arranged at the respective doors, a power source means connected to the switch means and the means for displacing, means for immediately returning the feeder arm means from the forward position to the retracted position upon a locking of the locking means, and means for initiating the returning of the feeder arm means from the forward position to the retracted position after a predetermined time interval if the locking means is not locked, and in that the means for displacing are adapted to initiate the displacement of the feeder arm means from the retracted position to the forward position upon a closing of the door of the vehicle.

3. A mechanism according to claim 2, characterized in that the feeder arm means are respectively mounted in the motor vehicle so as not to impair access to a rear seat area of the motor vehicle when the feeder arm means are in the retracted position, and in that the means for displacing are adapted to displace the feeder arm means in a straight feeding direction.

4. A mechanism according to claim 1 or 2 or 3, characterized in that means are provided for enabling the respective feeder arm means to be manually displaced to the retracted position when the overload safety means is actuated.

5. A mechanism according to claim 4, characterized in that the means for displacing includes a servo means comprising a drive motor and a transmission means for transmitting driving power to the feeder arm means.

6. A mechanism according to claim 5, characterized in that the means for immediately returning the feeder arm means includes a switch means provided in the locking means, and a switch relay means for reversing a direction of rotation of the drive motor.

* * * * *